Figure 1:
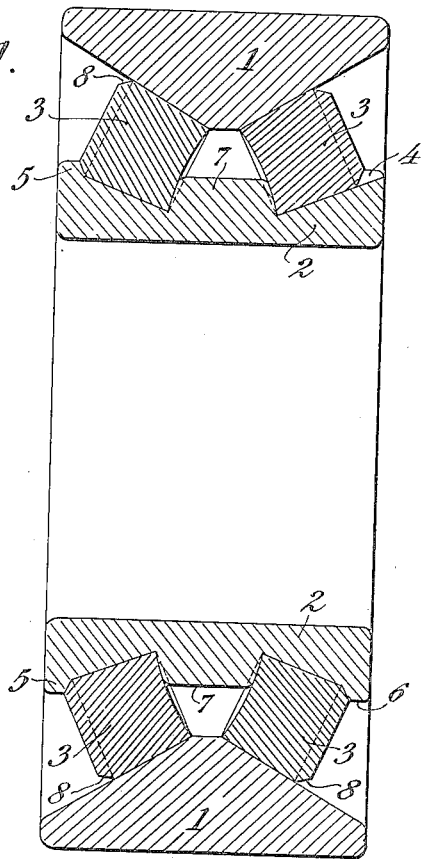

N. A. PALMGREN.
ROLLER BEARING.
APPLICATION FILED OCT. 13, 1919.

1,397,142.

Patented Nov. 15, 1921.
10 SHEETS—SHEET 1.

INVENTOR :
Nils Arvid Palmgren
By Attorneys,

N. A. PALMGREN.
ROLLER BEARING.
APPLICATION FILED OCT. 13, 1919.

1,397,142.

Patented Nov. 15, 1921.
10 SHEETS—SHEET 2.

INVENTOR:
Nils Arvid Palmgren
By Attorneys,

N. A. PALMGREN.
ROLLER BEARING.
APPLICATION FILED OCT. 13, 1919.

1,397,142.

Patented Nov. 15, 1921.
10 SHEETS—SHEET 3.

INVENTOR :
Nils Arvid Palmgren
By Attorneys,
Chaser, Dark & Myers

N. A. PALMGREN.
ROLLER BEARING.
APPLICATION FILED OCT. 13, 1919.

1,397,142.

Patented Nov. 15, 1921.
10 SHEETS—SHEET 5.

INVENTOR
Nils Arvid Palmgren
By Attorneys,

N. A. PALMGREN.
ROLLER BEARING.
APPLICATION FILED OCT. 13, 1919.

1,397,142.

Patented Nov. 15, 1921.
10 SHEETS—SHEET 7.

INVENTOR:
Nils Arvid Palmgren
By Attorneys,

N. A. PALMGREN.
ROLLER BEARING.
APPLICATION FILED OCT. 13, 1919.

1,397,142.

Patented Nov. 15, 1921.
10 SHEETS—SHEET 8.

INVENTOR :
Nils Arvid Palmgren
By Attorneys,

INVENTOR :

Nils Arvid Palmgren
By Attorneys,

N. A. PALMGREN.
ROLLER BEARING.
APPLICATION FILED OCT. 13, 1919.

1,397,142.

Patented Nov. 15, 1921.
10 SHEETS—SHEET 10.

INVENTOR:
Nils Arvid Palmgren
By Attorneys,
Fraser, Dark & Myers

UNITED STATES PATENT OFFICE.

NILS ARVID PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

ROLLER-BEARING.

1,397,142.

Specification of Letters Patent.   Patented Nov. 15, 1921.

Application filed October 13, 1919. Serial No. 380,402.

*To all whom it may concern:*

Be it known that I, NILS ARVID PALMGREN, a subject of the King of Sweden, residing at Gottenborg, in the Kingdom of Sweden, have invented a new and useful Improvement in Roller-Bearings, of which the following is a specification.

The present invention relates to a roller bearing which is provided with conical rollers so that the bearing may be arranged for taking up radial pressure as well as axial thrust, the latter in one direction or in both directions, the purpose of the invention being to provide a bearing in which the rollers are well guided. In prior bearings of the kind referred to the rollers are guided exclusively or mainly by the roller cage or retainer, but such guiding is as a rule not very satisfactory.

In contra-distinction hereto the bearing forming the subject of the present invention is broadly characterized by the fact that each roller is guided partly by at least one pressure flange which prevents the roller from moving in direction toward its large end, and partly by at least one guide flange against which the roller bears in at least two points which lie after one another in the direction of rolling so that the guide flange together with the pressure flange prevents displacement of the roller obliquely to the direction of rolling. In this manner the rollers are guided exclusively or mainly by the race or races and not very considerably by the roller retainer the purpose of which is only to maintain the rollers at definite distances from one another. The pressure flange may be formed in the well known manner and may bear against a portion of the roller also formed in the well-known manner. On the other hand, the guide flange should preferably be provided with a convex bearing surface if it is so placed in relation to the rollers that it supports said rollers against movement in direction toward their small ends, but said flange should be provided with a concave bearing surface if it supports the rollers against movement in the opposite direction. The end surface of the roller which is to bear against the guide flange should be concave in the first instance but convex in the latter instance. When the rollers occupy their proper rolling positions they bear with pressure only against the pressure flange, but merely contact with the guide flange so that the bearing pressure against said flange is practically *nil*. Each roller will bear against the flanges at least at three points, however, which points are so located as to form a triangle having a certain extension in the rolling direction, that is to say, in the tangential direction. Again, if a roller has a tendency to adjust itself obliquely to the rolling direction it will also press against the guide flange in such manner that two points on the end surfaces of the roller will bear with pressure against the flanges. One of said two points is located on the pressure flange and the other point is located on the guide flange, and the two points have such positions relatively to one another that the pressures at said points prevent a further oblique position of the roller.

The pressure flanges and the guide flanges may be formed in the same race which arrangement provides the best guiding and is thus as a rule most suitable, but said flanges may also be formed on separate races. It is not necessary, however, that the flanges be made integral with the race or races, but they may also be made as separate parts, in which case, however, they must be so located in the bearing as to be guided in the radial and axial directions, although they may be freely movable in tangential direction.

A plurality of embodiments of the invention are shown by way of example in the accompanying drawings.

Figure 2:
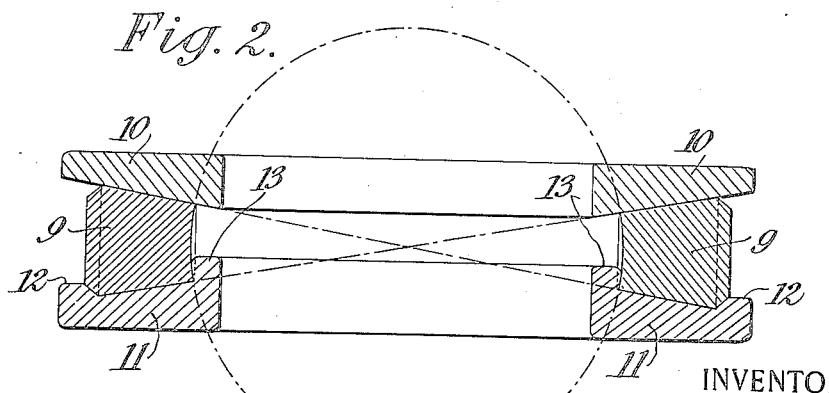
Figure 16:
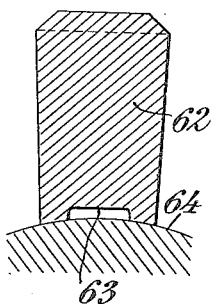
Figure 17:
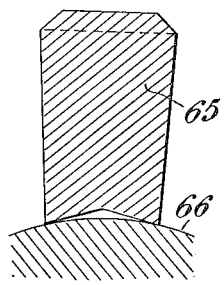
Figure 18:
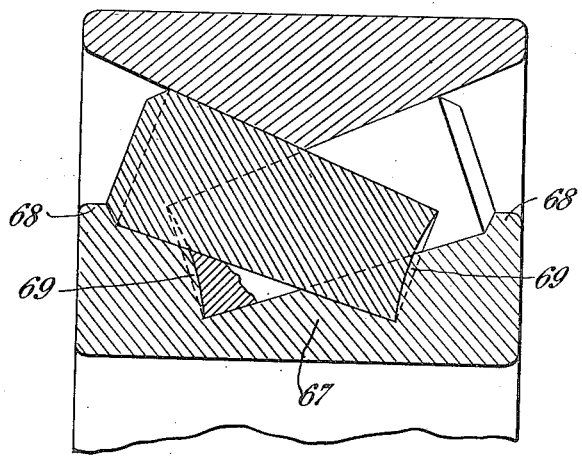
Figure 32:
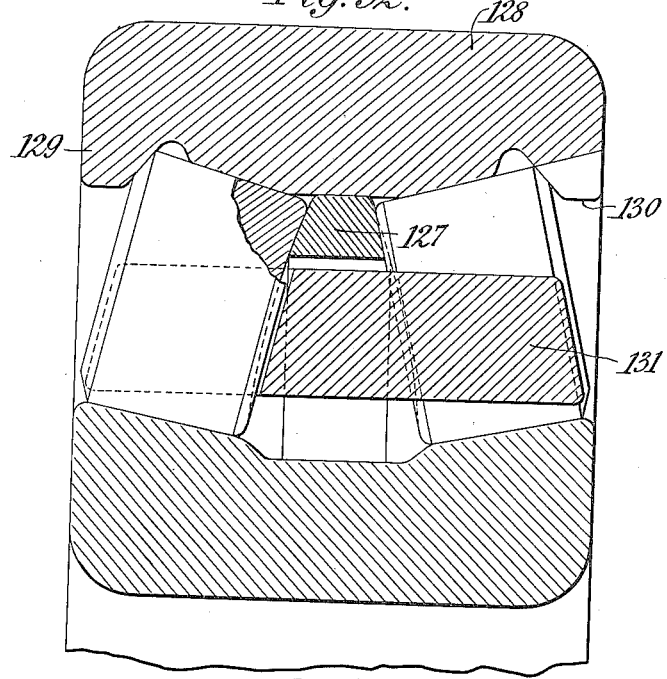
Figure 33:
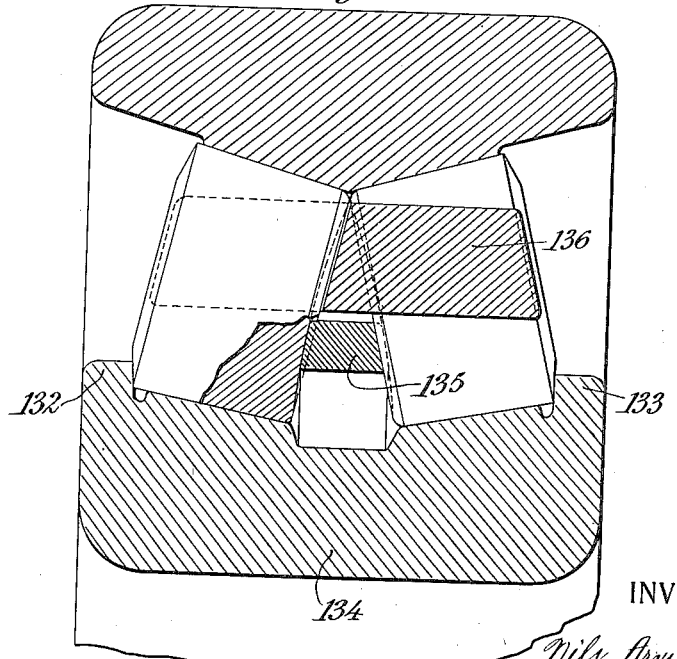
Figure 34:
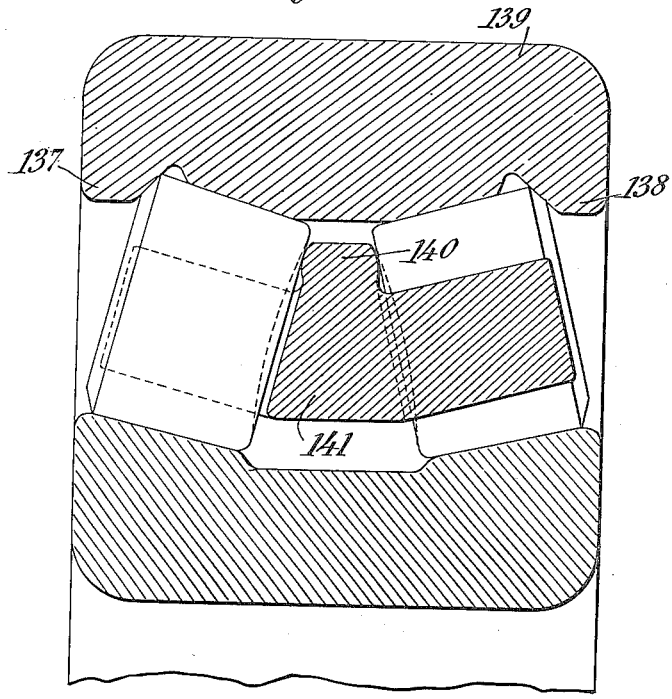
Figure 35:
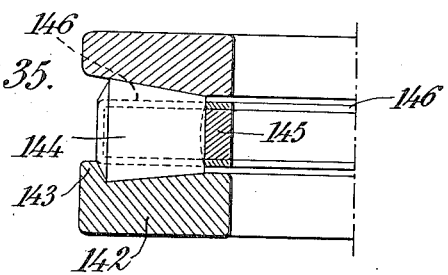
Figure 36:
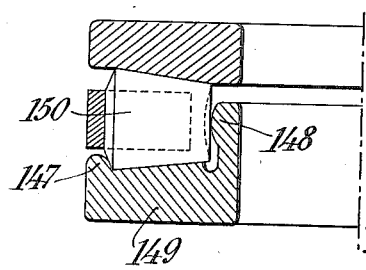
Figure 37:
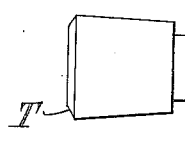
Figure 38:
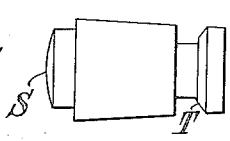
Figures 39, 40:
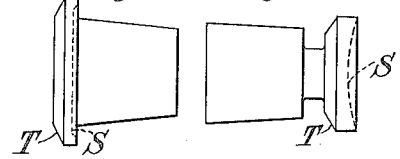
Figure 41:
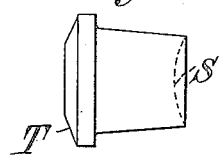
Figure 42:
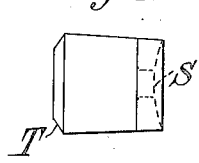
Figure 43:
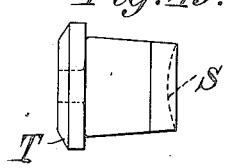
Figure 44:
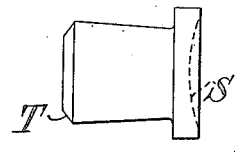
Figure 45:
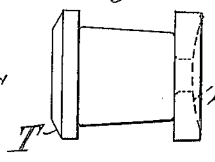
Figure 46:
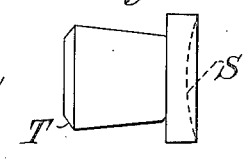
Figure 47:
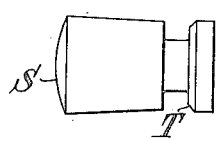
Figure 48:
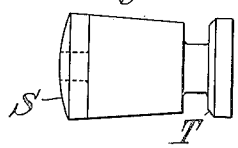
Figure 49:
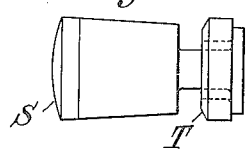
Figure 50:
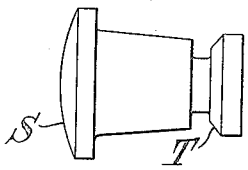
Figure 51:
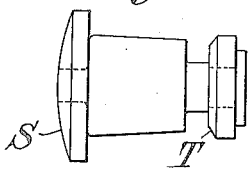
Figure 52:
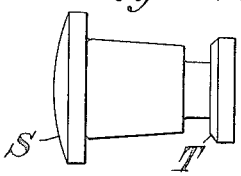
Figure 53:
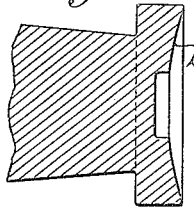
Figure 54:
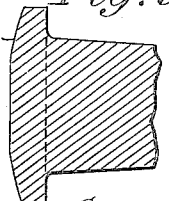
Figure 55:
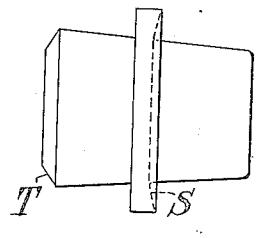
Figure 56:
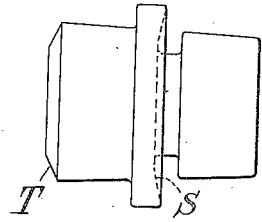
Figure 57:
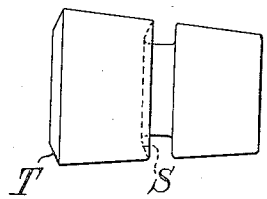
Figure 58:
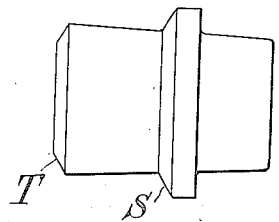
Figure 59:
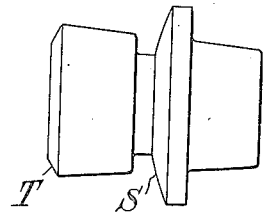
Figure 60:
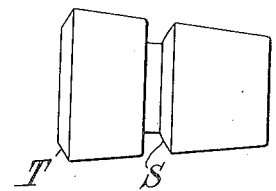
Figures 61, 62:
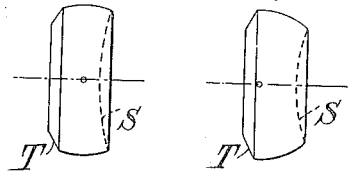
Figure 63:
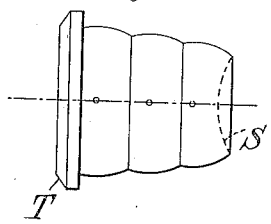
Figure 64:
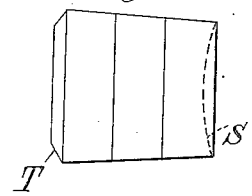
Figure 65:
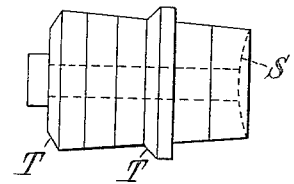

Figure 1 shows an axial section through a two-row radial pressure roller bearing which is also capable of taking up axial thrusts in both directions. Fig. 2 shows an axial section of a roller bearing for taking up thrust. Figs. 3 to 8 incl. show sections of different embodiments of single row radial pressure roller bearings. Figs. 9–17 show sectional views of different embodiments of the rollers, the sections being taken through the axes of the rollers. Fig. 18 is a section of a two-row radial pressure roller bearing in which the rollers of the one row project in between the rollers of the other row. Figs. 19 to 27 incl. show sections of different embodiments of single row radial pressure roller bearings which, in addition to pressure flange and guide flange, are also provided with a special locking flange in order to prevent the bearing from coming apart. Figs. 28 to 31 incl. show two-row radial pressure roller bearings with divided inner races, the pressure flanges or the guiding flanges being made as separate rings rigidly connected with the races proper. Figs. 32 and 33 show two different two-row roller bearings in which the guide flange is made as a separate ring which is guided in radial and axial directions, and Fig. 34 shows a two-row radial pressure bearing in which the guide flange is made integral with the roller retainer. Figs. 35 and 36 show two different axial thrust roller bearings, and finally, Figs. 37 to 65 incl. show further embodiments of the rollers.

The roller bearing illustrated in Fig. 1 is provided with an outer race 1 and an inner race 2, each of said races being made in one piece, and with two rows of conical rollers 3 which are inclined in opposite directions. In this manner the bearing becomes self-contained, that is to say, it is held together by the rollers as a unit capable of being mounted, and it may take up not only radial pressure but also axial thrust in both directions. Each race is provided with two conical tracks or rolling surfaces for the rollers 3. For enabling the rollers to be introduced into the bearing, it is provided with a filling opening 4. According to the present invention the inner race 2 is provided with two pressure flanges 5 and 6, one for each row of rollers, and with a guide flange 7 common to both rows of rollers, and which guide flange supports the rollers against inward movement. All of said flanges are made integral with the inner race. Each roller is provided at its large end, which is directed outward from the center of the bearing, with a chamfer 8 which bears against the conical bearing surface on the pressure flange 5 or 6, so that the rollers are in this manner prevented from outward movement, that is to say in the direction toward their large ends. The end surfaces at the small ends of the rollers are spherically concave in such manner that the center of the sphere is located in the point or vertex of the cone, and the bearing surfaces of the guide flange 7 are spherically convex with the same radius and center, so that contact takes place between each roller and the bearing surface of the guide flange on a surface, that is to say, in a plurality of points.

The distance between the pressure flange 5 or 6 and the guide flange 7 is so adjusted that as long as each roller occupies its proper rolling position it bears with pressure only against the pressure flanges, contacting with the same by means of its chamfer 8 only in one point or along a line, whereas it just merely touches the guide flange, so that the bearing pressure on the bearing surface of the guiding flange 7 above referred to is practically *nil*. On account thereof the friction losses in the bearing surface also become very small. However, if for any reason a roller has a tendency to adjust itself obliquely to the rolling direction, pressure will arise also between the concave end surface of the roller and the guide flange, said pressure appearing either at the forward or the rear edge, taken in the rolling direction, of the said end surface, as the large end of the roller tends to run ahead, or in the rear, of the small end. The pressure of the guide flange against the small end and the pressure of the pressure flange against the large end, which latter pressure always acts in a plane through the axes of the roller and of the bearing, form a pair of forces which tend to turn the roller back into its proper position. The guide flange and the pressure flange thus coact to prevent the rollers from adjusting themselves obliquely to the rolling direction.

The thrust bearing illustrated in Fig. 2 is provided with a row of rollers 9 which have the same shape as the rollers in the radial pressure bearing described above and illustrated in Fig. 1. Each of the races 10 and 11 is made in one piece, and the race 11 is provided with a pressure flange 12 and a guide flange 13, both of which are made integral with the race 11. The conical rollers bear with their large ends directed outward from the center of the bearing, against the pressure flange 12 and are thus prevented from outward movement, and their spherically concave end surfaces on the small ends contact with the convex bearing surface of the guide flange 13, which surface forms a spherical zone the center of which coincides with the center of the bearing. The guiding of the rollers is thus also in this case effected by the two flanges in the same manner as above described. It will easily be understood that no filling opening is required in the bearing illustrated in Fig. 2.

Figure 3:
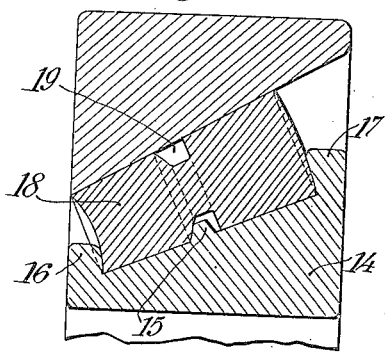

In the single row radial pressure bearing illustrated in Fig. 3 the inner race 14 is provided with a pressure flange 15 in the middle and with two guide flanges 16 and 17 at the sides. The guide flange 16 supports the rollers 18 at their small ends and is provided with a convex bearing surface, while the flange 17 which supports the large ends of the rollers, has a concave bearing surface. Each roller 18 is provided approximately at its middle with a groove 19 one side surface of which forms a bearing surface for the pressure flange 15. The end surface at the small end of the roller is spherically concave, and the end surface at the large end is spherically convex, and the guiding effect of the flanges will thus also in this case be the same as above described, with the difference only, that the guiding becomes double in that, if a roller tends to adjust itself obliquely, there will be pressure at three places, namely one place on each flange.

Figure 4:
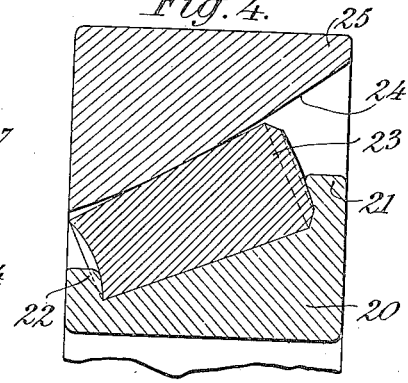

According to Fig. 4 the inner race 20 is provided with a flange 21 which forms pressure flange as well as guide flange, and with a guide flange 22. The firstnamed flange supports the rollers 23 at the large ends, while the guide flange 22 which is provided with a convex bearing surface, contacts with the concave end surfaces at the small ends of the rollers. In this embodiment the track or rolling surface 24 on the outer race 25 is slightly convex, so that it contacts with the rollers only at their middle points.

Figure 5:
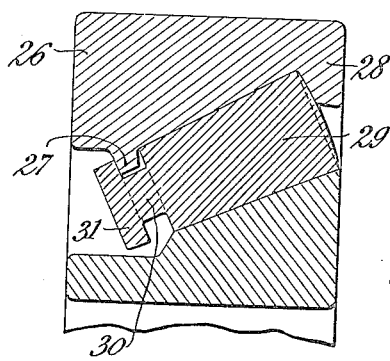

In the embodiment illustrated in Fig. 5 the outer race 26 is provided with a pressure flange 27 and a guide flange 28 with spherically concave bearing surface. Each roller 29 is provided at the small end with a smaller neck 30 terminating into a head 31 against the end surface of which directed toward the roller the pressure flange 27 bears, so that also in this case it prevents the roller from moving in the direction toward its large end, to the right in Fig. 5. The guide flange 28 supports the roller at the large end which is provided with a spherically convex end surface.

Figure 6:
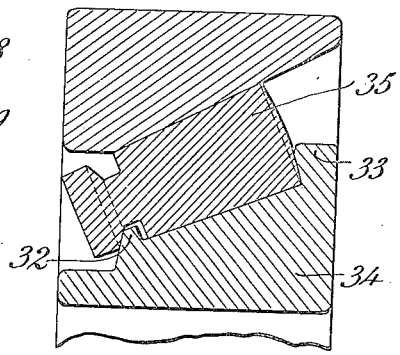

The embodiment illustrated in Fig. 6 differs from the embodiment according to Fig. 5 only by the pressure flange 32 and the guide flange 33 being provided on the inner race 34. The rollers 35 have the same shape as in Fig. 5, and the operation will thus also in this case be the same.

Figure 7:
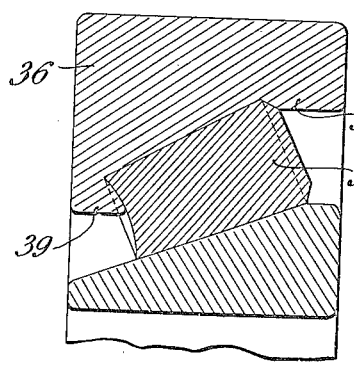
Figure 8:
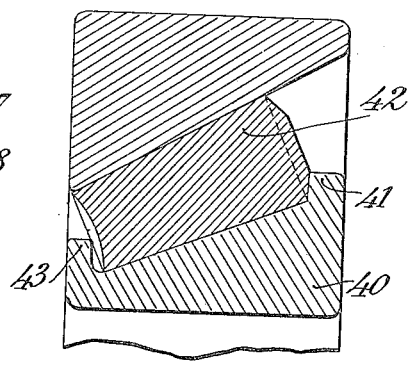

According to Fig. 7 the outer race 36 is provided with a pressure flange 37 which supports the rollers 38 at the large ends, and with a guide flange 39 having a spherically convex bearing surface which supports the rollers at the small ends. The rollers are provided at the last mentioned ends with spherically concave end surfaces.

Again, according to Fig. 8 the inner race 40 is provided with a pressure flange 41 which supports the rollers 42 at the large ends, and with a guide flange 43 which supports the rollers at the small ends where the rollers are provided with concave end surfaces. The bearing surface of the guide flange is not spherically convex in this case, however, but it is convex with a smaller radius of curvature so that it only contacts with the end surface of the roller at two points. Said two points, however, are located after one another in the rolling direction, so that also in this case the guiding effect of the flanges becomes similar to that above described in respect of the embodiment shown in Fig. 1.

It is easily understood that all bearings illustrated in Figs. 3 to 8 incl. may be assembled without filling opening, but each bearing can take up axial thrust only in one direction.

Figure 9:
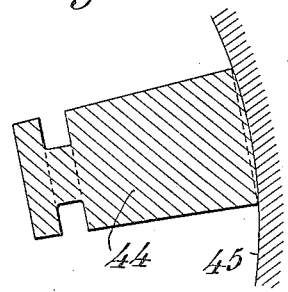
Figure 10:
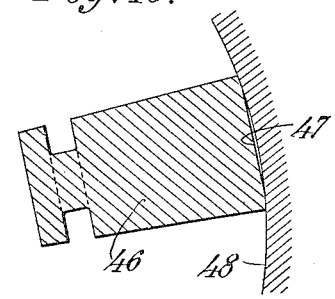
Figure 11:
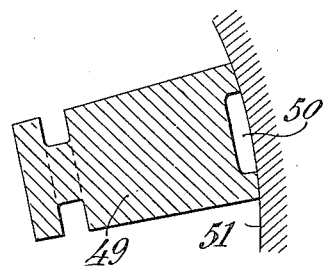
Figure 12:
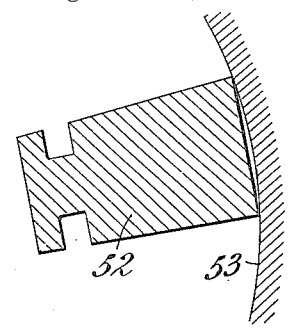
Figure 13:
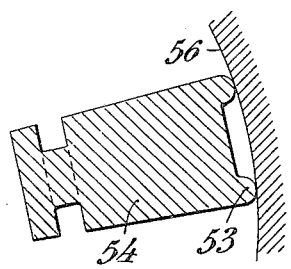

Figs. 9 to 17 incl. show a few different shapes of the end surfaces of the rollers which are to bear against the guide flange. Said flange is provided with a spherical bearing surface, and the sphere is assumed to be continued in such manner that a section of the sphere in the plane of its great circle is obtained. The rollers are shown in axial sections. Fig. 9 illustrates the case corresponding to Figs. 5 and 6, that the end surface of the roller 44 and the bearing surface 45 of the guide flange are spherical and have the same radius. In Fig. 10 the end surface at the large end of the roller 46 is also convex, but is cut off so that only its outer zone is spherical, whereas its middle portion 47 is plane. The roller will then bear only with the spherical zone of the end surface against the bearing surface 48 of the guide flange. The roller 49 illustrated in Fig. 11 differs from the one shown in Fig. 10 only by there being provided a central recess 50 in the end surface of the roller, the outer zone of the end surface still being spherical and bearing against the spherical bearing surface 51 of the guide flange. According to Fig. 12 the end surface of the roller 52 is plane, so that it only bears with its edges against the bearing surface 53 of the guide flange. In such case, however, the edges should preferably be slightly rounded or chamfered so as to avoid that a sharp edge on the roller bears under pressure against the guide flange. For this purpose the embodiment illustrated in Fig. 13 may be chosen, for instance, according to which embodiment the roller 54 bears with its rounded edge 55 against the bearing surface 56 of the guide flange.

Figure 14:
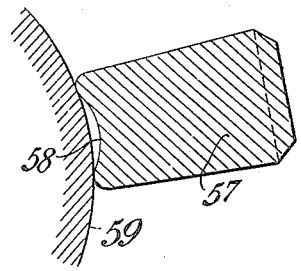
Figure 15:
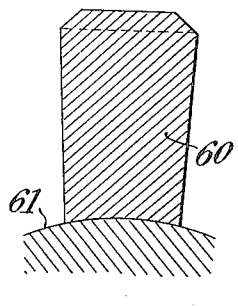

On the other hand, if the guide flange supports the roller at its small end, the end surface of the roller should be concave. Accordingly, as shown in Fig. 14, the roller 57 is provided with a concave end surface 58 which bears against the convex bearing surface 59 of the guide flange. The radius of curvature of the end surface 58 is in this case smaller than that of the surface 59, so that the firstnamed surface only bears with its edges against the lastmentioned surface. On the other hand, according to Fig. 15, the end surface on the roller 60 and the bearing surface 61 of the guide flange have the same radius of curvature, so that the whole of the firstnamed surface contacts with the lastmentioned surface. Fig. 16 shows a similar construction, the only difference being that there is a central recess 63 in the end surface of the roller 62, so that only the outer zone of said end surface contacts with the bearing surface 64 of the guide flange. Finally, Fig. 17 illustrates the case that the end surface of the roller 65 is conical, the conical surface contacting with the flange surface 66 on a circle.

It will be understood from the examples above described, that the surface of the rollers bearing against the guide flange should be concave if the flange supports the rollers at their small ends, but convex if the flange supports the rollers at their large ends. In any case said concave or convex surface on the rollers should be a surface of rotation the axis of which coincides with the axis of the conical roller. The surface of rotation may be a spherical calotte, Figs. 9 and 15, or zone, Figs. 10, 11 and 16, having its center in the point of the cone or located nearer to the roller than said point. It may also be a cone, Fig. 17, or a broken surface, that is to say, formed in such manner that only a certain zone of the end surface is formed as a sphere, a cone, or the like, and the other portions as some other surface of rotation. If both the end surface of the roller and the bearing surface of the guide flange are spherical and have the same radius, surface contact will be obtained. If the bearing surface of the guide flange is spherical, but the end surface of the roller is some other surface of rotation, a line contact will be obtained, and finally, if the bearing surface of the guide flange has some other shape than spherical, a point contact will be obtained.

Fig. 18 shows a two-row self-contained radial pressure bearing in which the rollers lie in zig-zag, and the conical tracks or rolling surfaces for the two rows of rollers on the inner race 67 alternate with one another in the well-known manner. The pressure and guide flanges are provided on the inner race, in similar manner as in the embodiment illustrated in Fig. 1, that is to say, the pressure flanges 68 support the rollers at their large ends, and the guide flanges 69 provided with spherically convex bearing surfaces support the rollers at their small ends.

The construction of the single row radial pressure bearings above described and illustrated in Figs. 3 to 8 incl., is such that the bearings are not self-contained, and the races belonging to different bearings may therefore easily be confounded, and one or more rollers may drop out and become lost when the bearings are being mounted. In order to avoid this inconvenience it is suitable to provide the race which is not provided with pressure and guide flanges, with a special retaining flange or locking flange which makes the bearing self-contained. For this purpose the locking flange should be provided on the side of the bearing toward which the large ends of the rollers are directed, and it may be provided with a filling opening for rendering it possible to insert the rollers into the bearing, if it is desired to introduce the largest possible number of rollers into the bearing. Again, if it is deemed sufficient to use a so great number of rollers as may be introduced after displacing the inner race eccentrically with relation to the outer race, no special filling opening will be required. Furthermore, the introduction of the full number of rollers may also be rendered possible by making the locking flange as a separate part, or by making the bearing with divided races, for instance in such manner that either the guiding flange, or the pressure flange, or possibly both flanges are made as separate parts. With the lastmentioned construction several advantages are attained among which may be noted that the manufacture of the various parts, races and flanges, is materially facilitated, and that faults due to wear on the rollers or the races may be repaired by exchanging one or more small ring portions.

Figure 19:
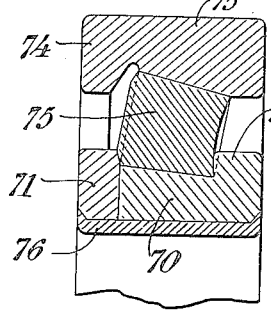
Figure 20:
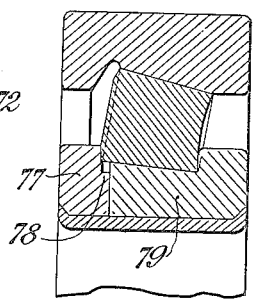
Figure 21:
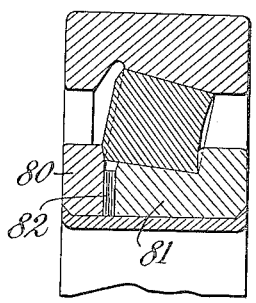

Figs. 19 to 27 incl. illustrate by way of example a few single row bearings which are provided with such locking flanges. In the construction shown in Fig. 19 the inner race 70 is provided with a pressure flange 71 and a guide flange 72, the outer race 73 being provided with a locking flange 74. Said last-mentioned flange which is located at some distance from and outside of the large ends of the rollers 75, is made integral with the outer race, according to this construction. It will be understood from the drawing that said flange prevents the rollers from dropping out of the bearing, which will thus be self-contained. The inner race is divided, the pressure flange 71 being made as a separate part and connected with the inner race proper by means of a sleeve 76 introduced into the inner race and the pressure flange and bent outward at the ends. Fig. 20 shows a similar construction which differs from the one shown in Fig. 19 only by a slightly different shape of the separate part forming the pressure flange 77, which is provided with a cut 78 in the side directed toward the inner race 79. In this manner it is attained that by exchanging the flange 77 it is possible to compensate wear on the flanges and the rollers. For such purpose, according to Fig. 21, a loose ring 82 is inserted between the pressure flange 80 and the inner race 81. By inserting such rings of different thicknesses it is obviously possible to compensate the wear on rollers and flanges.

Figure 22:
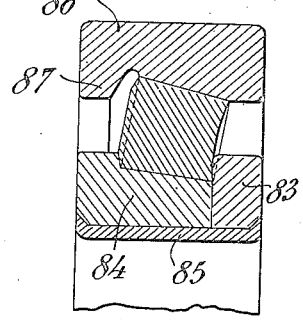
Figure 23:
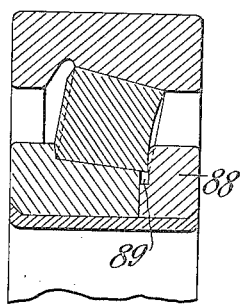
Figure 24:
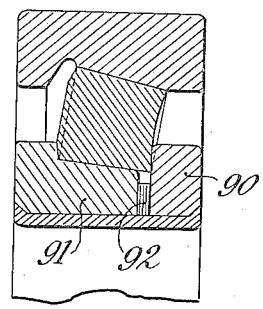

The embodiment shown in Fig. 22 differs from the construction illustrated in Fig. 19 only by the guide flange 83 of the inner race, instead of the pressure flange, being made as a separate part and connected with the inner race 84 by means of a sleeve 85 bent outward at the ends. The outer race 86 corresponds completely to that shown in Fig. 19, and like this flange it is provided with a locking flange 87 made integral with the outer race. Figs. 23 and 24 show modifications of Fig. 22 similar to the modifications of Fig. 19 illustrated in Figs. 20 and 21, that is to say, according to Fig. 23 the guide flange 88 is provided with a cut 89, while according to Fig. 24 a loose ring 92 is provided between the guide flange 90 and the inner race 91, for the purpose of making it possible to compensate wear.

Figure 25:
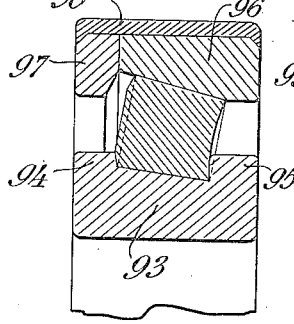
Figure 26:
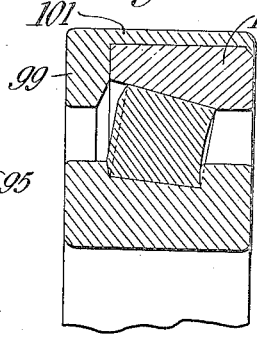
Figure 27:
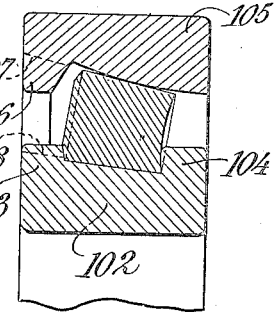

In the construction illustrated in Fig. 25 the pressure flange 94 and the guide flange 95 are made integral with the inner race 93, whereas, on the other hand, the locking flange 97 on the outer race 96 is made as a separate part. The locking flange is rigidly connected with the outer race by means of a sleeve 98 provided around said flange and said race and bent inward at the ends. According to Fig. 26 the locking flange 99 is also made as a separate part from the outer race 100, but it is made integral with a sleeve 101 placed around the outer race and riveted, so that in this manner the locking flange becomes rigidly connected with the outer race. Finally, Fig. 27 illustrates a construction in which both races are made integral with their flanges, the inner race 102 with the pressure flange 103, and the guide flange 104 and the outer race 105 with the locking flange 106. For rendering it possible to introduce the rollers the locking flange is provided with a filling opening 107, and the opposing pressure flange on the inner race may simultaneously be provided with a similar opening 108. In such case, however, said last-mentioned opening should not extend all the way in to the conical track on the inner race, but it should end at some distance above said track. The rollers may then be introduced either by forcing together the races, with or without heating the outer race, or possibly without forcing, provided that the outer race is moved in the direction toward the point of the rolling cones, which movement is possible if, as shown in Fig. 27, the locking flange does not touch the rollers in the normal position of the race but is at some distance from said rollers.

Also in two-row bearings, in which no special locking flange is required for maintaining the bearing as a unit, it will often be advantageous to divide one of the races and, for instance, to make the pressure flanges or the guide flanges as separate parts. In this manner it will be possible to avoid special filling openings, and the advantages in respect of manufacture and compensation of wear above referred to are also attained. Figs. 28 to 31 incl. show by way of example a few two-row bearings with divided inner races.

Figures 28, 29:
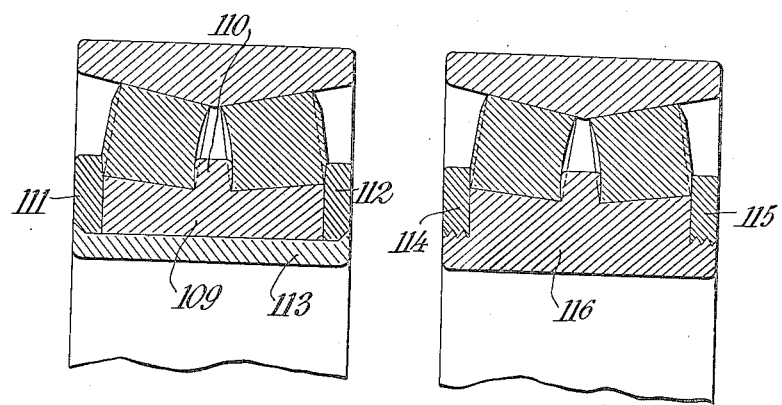
Figures 30, 31:
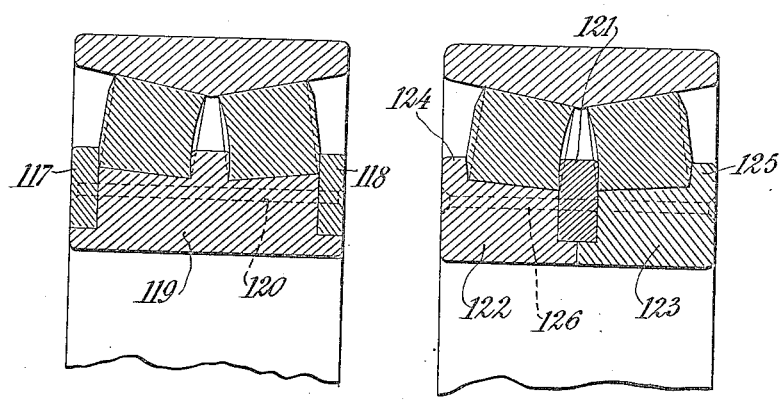

In the construction illustrated in Fig. 28 which most nearly resembles the bearing shown in Fig. 1, the inner race 109 is provided with a guide flange 110 common to both rows of rollers and made integral with the inner race, and with two pressure flanges 111 and 112 each of which is made as a separate part. Said pressure flanges are rigidly connected with the inner race by means of a sleeve 113 inserted through the inner race and through the two flanges and having its ends bent outward. According to Fig. 29 the two pressure flanges 114 and 115 on the inner race is also made as separate parts, but they are connected with the inner race 116 by means of screw threads. According to Fig. 30 the pressure flanges 117 and 118 are connected with the inner race 119 by means of bolts 120 traversing the race and both flanges and riveted at the ends. Finally, Fig. 31 shows a construction in which the guide flange 121 is made as a separate part, the inner race being made in two portions 122 and 123 between which the guide flange is inserted. Each of the two pressure flanges 124 and 125 is made integral with one of the portions of the inner race. The parts 121, 122 and 123 are held together by means of traversing bolts 126 riveted at the ends.

In all constructions above described the guide and pressure flanges are either made integral with their races or, if they are made as separate parts, rigidly connected with the races. This last mentioned arrangement, however, is not necessary, but the flanges, when made as separate parts, may also be so located in the bearing as to have a certain capacity of movement in the tangential direction, that is to say, in the rolling direction, and thus are free to follow the rollers, whereas, on the other hand, they should be so guided in both radial and axial directions that they always occupy a definite position in these directions in relation to the races. It may be advantageous to arrange particularly the guide flanges in this manner, an essentially facilitated manufcture of the races being thus obtained as well as less friction at the guide flange which will also be easily exchanged when worn.

Fig. 32 illustrates a two-row radial pressure bearing in which the guide flange common to both rows of rollers is made as a loose ring 127 located in the center of the bearing immediately inside of the outer race 128. Said race is provided with two pressure flanges 129 and 130 which are made integral with the outer race and the last mentioned of which flanges is provided with a filling opening. The outward chamfered large ends of the rollers bear against the pressure flanges, and the inner spherically concave end surfaces of the rollers bear against the ring 127 which is provided on both sides with spherically convex bearing surfaces in the same manner as the stationary guide flange 7 in the bearing shown in Fig. 1. The ring 127 is prevented from moving in axial direction by the rollers the movement of which is prevented by the pressure flanges, and the ring is guided in radial direction by the rollers and the outer race against which the outer side of the ring bears. On the other hand, the ring is freely movable in tangential direction, on account of which it will follow the rollers at least to a certain degree when the bearing is in operation, so that the friction between the rollers and the ring becomes decreased. It is also obvious that it is easier to manufacture the spherical bearing surfaces on the loose ring than on a flange integral with the race. The ring 127 in this construction is independent of the roller retainer 131, which serves in the ordinary manner for maintaining the rollers at definite distances from one another.

The construction illustrated in Fig. 33 differs from the construction last described mainly by the two pressure flanges 132 and 133 being provided on the inner race 134, and by that, accordingly, the loose ring 135 forming the guide flange common to both rows of rollers, is located nearer to the inner race, although at some distance from the same. The ring 135 is located inside of and is independent of the roller retainer 136 and is also in this case provided on both sides with spherically convex bearing surfaces against which the spherically concave end surfaces on the small ends of the rollers bear. The ring is in this case guided in both axial and radial directions by the rollers which in turn are guided by the pressure flanges, but the ring is free to move in tangential direction.

Fig. 34 illustrates another modification of the bearing according to Fig. 32. The two pressure flanges 137 and 138 are also in this case provided on and made integral with the outer race 139, but the ring 140 which forms the guide flange common to the two rows of rollers is in this case made integral with the roller retainer 141. The end surfaces at the small ends of the rollers are concave, and the bearing surfaces of the ring 140 are convex, but do not have spherical shape as a result of which contact will take place between each roller and the guide ring 140 at two points. The ring is guided in radial and axial directions by the rollers, but it is free to move in the rolling direction, and the ring being made integral with the roller retainer it will of course move with the same speed as the rollers.

The arrangement of a guide flange freely movable in tangential direction is applicable also to axial thrust bearings. Fig. 35 illustrates an example of such an arrangement. In this construction the one race 142 is provided with a pressure flange 143 made integral with the race and against which the rollers 144 bear with their large ends. The guide flange is formed by a separate ring 145 the outer surface of which is spherically convex and against which the inner spherically concave end surfaces of the rollers bear. On account hereof the ring is prevented by the rollers from moving in both axial and radial directions, but it is free to move in tangential direction. The ring is in this case independent of the roller retainer 146, which may be made for instance of pressed sheet metal.

Fig. 36 shows a modification of the axial thrust bearing illustrated in Fig. 2 which differs from said bearing only as regards the shape of the bearing surface of the guide flange. The pressure flange 147 as well as the guide flange 148 are made integral with the one race 149, but the bearing surface of the guide flange against which surface the small ends of the rollers 150 bear, is not spherical, on account of which there will be contact between each roller and the guide flange at two points in the same manner as in the construction shown in Fig. 34.

The constructions above described and illustrated in the drawings may, of course, be further modified in several respects without departing from the principle of the invention. Thus it is, for instance, not necessary that the rollers bear directly against the guide flange, but they may also bear against special loose members which in turn bear against the guide flange or flanges. Furthermore, the shape of the rollers may also be varied in several respects, as will be evident from Figs. 37 to 65 incl. which show some useful shapes of the rollers. In all these figures, the surfaces on the rollers which are to bear against pressure flanges, are indicated at T, while the surfaces which are to bear against guide flanges, are indicated at S. In order to attain an efficient guiding it is advantageous that the pressure and guide flanges, and thus also the corresponding surfaces on the rollers, are located adjacent one another, as shown for instance in Figs. 39 and 40. The portions of the rollers which are to bear against the pressure or guide flanges, may consist of washers or the like which are pivoted on the roller proper, as shown for instance in Figs. 49 and 51. The rollers may also be bored and may rotate on studs in the roller retainer and, finally, each roller may be composed of several parts, as shown for instance in Figs. 63 to 65 incl. The rollers may be located in the bearing in such manner that the points of the cones lie on the geometrical axis of the bearing, but the points may also lie to the one or the other side of said axis in order that the rollers shall more easily maintain their proper positions in the bearing.

I claim:

1. In a roller bearing, the combination of an inner race, an outer race, conical rollers, at least one pressure flange preventing the rollers from moving in direction toward their large ends, and at least one guide flange against which each roller bears in at least two points which lie after one another in the rolling direction so that said guide flange together with said pressure flange prevents the roller from displacing itself obliquely to the rolling direction.

2. In a roller bearing, the combination of an inner race, an outer race, conical rollers, at least one pressure flange preventing the rollers from moving in direction toward their large ends, and at least one guide flange having a convex bearing surface against which each roller bears in at least two points which lie after one another in the rolling direction, said guide flange being so located as to prevent the rollers from moving in direction toward their small ends.

3. In a roller bearing, the combination of an inner race, an outer race, conical rollers, at least one pressure flange preventing the rollers from moving in direction toward their large ends, and at least one guide flange having a convex bearing surface against which each roller bears in at least two points which lie after one another in the rolling direction, the end surfaces on the rollers bearing against said guide flange being concave.

4. In a roller bearing, the combination of an inner race, an outer race, conical rollers, at least one pressure flange preventing the rollers from moving in direction toward their large ends, and at least one guide flange against which each roller bears in at least two points which lie after one another in the rolling direction so that said guide flange together with said pressure flange prevents the roller from displacing itself obliquely to the rolling direction, said pressure flange and said guide flange being provided on one and the same race.

5. In a roller bearing, the combination of an inner race, an outer race, conical rollers, at least one pressure flange preventing the rollers from moving in direction toward their large ends, and at least one guide flange against which each roller bears in at least two points which lie after one another in the rolling direction so that said guide flange together with said pressure flange prevents the roller from displacing itself obliquely to the rolling direction, said pressure flange and said guide flange being made integral with one of the races.

6. In a roller bearing, the combination of an inner race, an outer race, conical rollers, at least one pressure flange preventing the rollers from moving in direction toward their large ends, and at least one guide flange against which each roller bears in at least two points which lie after one another in the rolling direction so that said guide flange together with said pressure flange prevents the roller from displacing itself obliquely to the rolling direction, each of said pressure and guide flanges being made integral with one of said races.

7. In a roller bearing, the combination of an inner race, an outer race, conical rollers, at least one pressure flange preventing the rollers from moving in direction toward their large ends, and at least one guide flange having a convex bearing surface against which each roller bears in at least two points which lie after one another in the rolling direction, the end surfaces on the rollers bearing against said guide flange being spherically concave in such manner that the center of the sphere lies in the point of the cone, and the bearing surface of the guide flange being spherically convex having the same radius and center, so that there will be surface contact between each roller and the bearing surface of said guide flange.

8. In a roller bearing, the combination of a pair of opposed races, rollers between said races, and a flange on one of said races arranged to contact with said rollers, the contacting surface on said flange being spherical and the coöperating surface on each roller being correspondingly spherical so that there is contact between said surfaces over a surface.

9. In a roller bearing, the combination of an inner race, an outer race, rollers therebetween, and a flange on one of said races arranged to contact with said rollers, the contacting surface on said flange being spherical and the coöperating surface on each roller being correspondingly spherical so that there is contact between said surfaces over a surface.

10. In a roller bearing, the combination of an inner race, an outer race, two series of rollers therebetween, and a flange on one of said races arranged between the two series of rollers and provided with surfaces against which the ends of the rollers of the two series contact, the contacting surfaces on said flange being spherical and the coöperating surface on each roller being correspondingly spherical so that there is contact between said surfaces over a surface.

11. A roller bearing according to claim 8 characterized by the fact that the flange therein recited is a guiding flange as distinguished from a pressure flange.

12. A roller bearing according to claim 9 characterized by the fact that one of the races is provided with a further flange bearing against and preventing the said rollers from moving in their axial direction.

13. In a roller bearing, the combination of a pair of opposed races, rollers therebetween, a guiding flange on one of said races arranged to contact with said rollers, the contacting surface on said flange being spherical and the coöperating surface on each roller being correspondingly spherical, and a pressure flange on one of said races bearing against and preventing the rollers from moving in their axial direction.

14. A roller bearing, according to claim 9 characterized by the fact that the spherical contacting surface of the flange therein recited is generated from a point located in the axis of rotation of the bearing as a center.

15. In a roller bearing the combination of a pair of opposed races, rollers therebetween and a guiding flange on one of said races arranged to contact with said rollers, the contacting surface on said flange being spherical and generated from a point located in the axis of rotation of the bearing as a center, and the coöperating surface on each roller being correspondingly spherical so that there is contact between said surfaces over a surface.

NILS ARVID PALMGREN.